May 19, 1959 J. C. TRAVILLA 2,887,186
RAILWAY TRUCK STRUCTURE
Original Filed April 30, 1951 2 Sheets-Sheet 1

Inventor
James C. Travilla
By Rodney Bedell
atty.

May 19, 1959  J. C. TRAVILLA  2,887,186
RAILWAY TRUCK STRUCTURE
Original Filed April 30, 1951  2 Sheets-Sheet 2
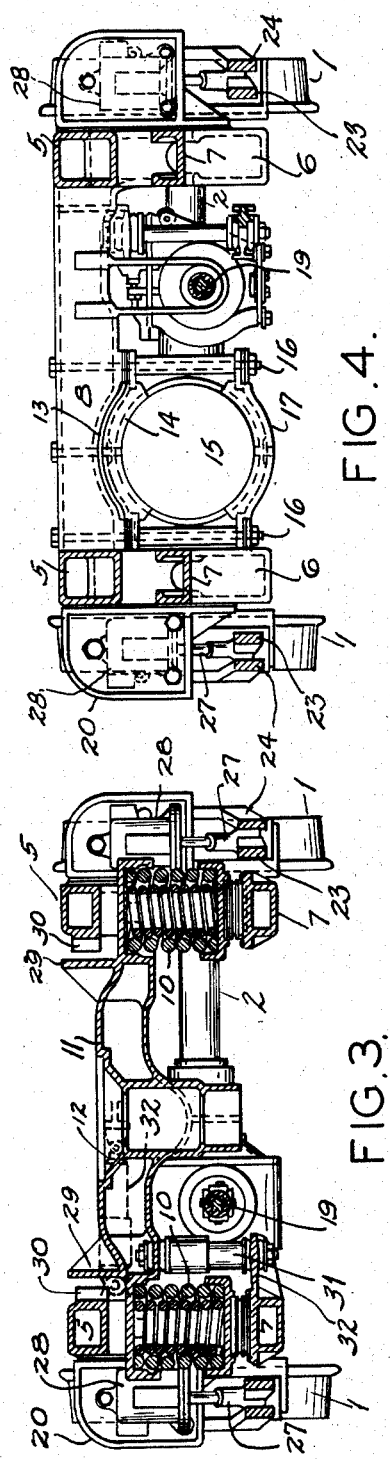
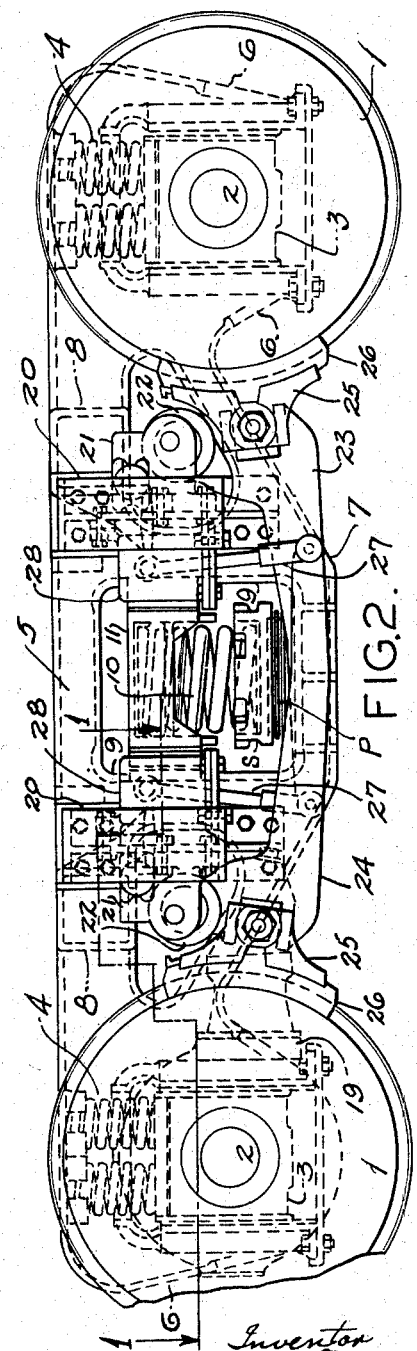
Inventor
James C. Travilla
By Rodney Bedell
atty.

United States Patent Office 2,887,186
Patented May 19, 1959

2,887,186

RAILWAY TRUCK STRUCTURE

James C. Travilla, Ladue, Mo., assignor to General Steel Castings Corporation, Granite City, Ill., a corporation of Delaware Original application April 30, 1951, Serial No. 223,729, now Patent No. 2,811,114, dated October 29, 1957. Divided and this application October 19, 1956, Serial No. 617,059

4 Claims. (Cl. 188—53)

The invention relates to railway rolling stock and more particularly to raliway motor truck structure and consists in a novel construction of a truck frame and a bolster and brake operating mechanism associated therewith.

This application is a division of an application filed April 30, 1951, Serial No. 223,729, now Patent No. 2,811,114.

The main object of the invention is to produce a simple, light weight, strong motor truck having good riding qualities and easy maintenance.

Another object is to position the brake operating mechanism on the sides of the truck to minimize the spacing of the wheeled axles and to facilitate access to the brake mechanism.

Another object is to simplify the brake operating mechanism.

These and other detail objects, as will appear from the following description, are attained by the structure shown in the accompanying drawings, in which:

Figure 2 is a side elevation of the truck.

Figures 3 and 4 are vertical, transverse sections taken on the corresponding section lines of Figure 1.

Figure 1:
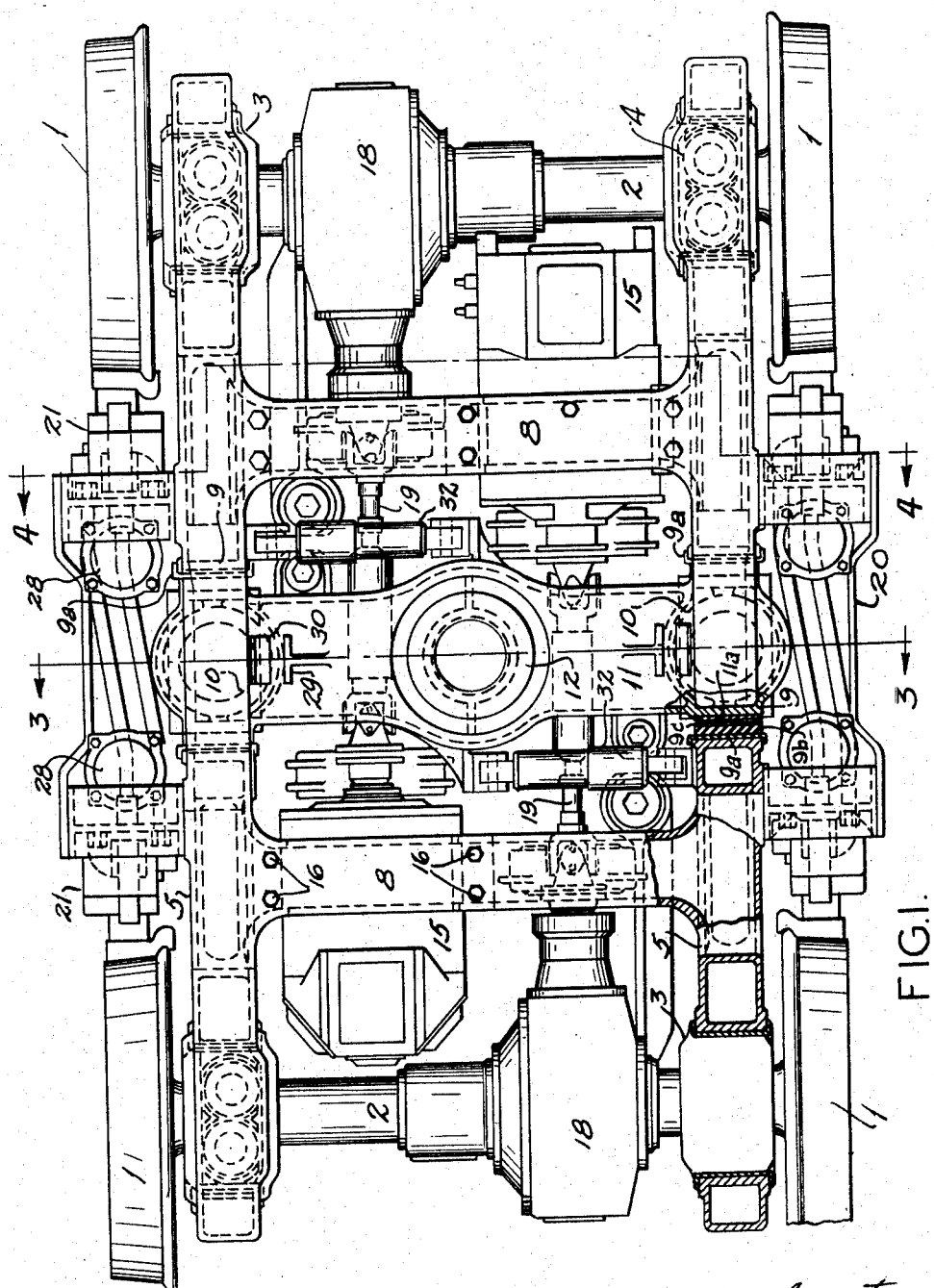
Figure 1 is a top view of a four wheel motor truck, a portion being sectioned horizontally on the line 1—1 of Figure 2.

The truck wheels, indicated at 1, are fixed on axles 2 terminating with the wheels and are provided with journals inwardly of the wheels which seat the journal boxes 3. Each box mounts one or more coil springs 4. The truck frame is a rigid structure, preferably a casting, and includes top side members 5, pedestal legs 6 depending therefrom, adjacent legs receiving journal boxes 3 between them, bottom members 7 spaced vertically from top members 5, and transverse transoms 8.

Columns 9 extend between frame members 5 and 7 and, with the latter, form deep windows for receiving helical springs 10 having seats S mounted on pads P of rubber-like material carried by elements on the frame lower members 7. The windows also receive the ends of a transverse bolster 11 mounted on springs 10 and provided with a load-carrying center plate 12. The bolster terminates adjacent the outer faces of the frame side members and inwardly from the wheel treads. The bolster ends are relatively shallow and the load-supporting middle portion is relatively deep. The bolster is positioned longitudinally of the truck by composite cushion and liner devices, each comprising a plate 9a secured to the column, a pad 9b of rubber-like material bonded to the plate, a wear plate 9c bonded to the other side of pad 9b, and a wear plate 11a secured to the bolster (Figure 1).

Members 5, 6, 7, 8 and 9 are of box section for greater rigidity and their walls merge with each other. Riveting and welding are substantially eliminated and each portion of each section may be effectively dimensioned to meet its special strength requirement.

Each transom 8 is recessed upwardly at 13 (Figure 4) to receive a bearing block 14 for a motor 15 which is suspended from the transom by bolts 16 and a lower bearing 17. Each motor 15 is operatively connected to the more remote axle 2 by a drive shaft 19 with suitable universal joint connections to the motor and a reduction gear 18. Each drive shaft extends under the bolster and under the transom remote from its motor.

At each side of the truck, the frame carries brake gear brackets 20 at opposite sides of the bolster window and having slack adjuster housings 21 mounted thereon. Pivoted to housings 21 by eccentrics 22, adjustably operated by the slack adjuster actuating device, are a pair of bell cranks 23, 24. The short arm of each bell crank is pivoted at its upper end to the side frame and below its pivot mounts an individual brake head 25 and shoe 26 for application to the adjacent wheel. The long arm of each bell crank extends lengthwise of the side frame below the level of the brake head mounting and is connected by an individual rod 27 to a piston in a brake cylinder 28, mounted on bracket 20 at the opposite side of the bolster window. Upon admission of air to cylinders 28, the pistons and rods 27 are forced downwardly, tilting the crank arms about their pivots 22 and thrusting the brake shoes against the wheels. With this arrangement, the entire brake rigging is positioned between and in line with the wheels.

The mounting of the journal boxes on inside journals avoids the necessity for longitudinally extending equalizers because the load is applied to the axles between the wheels, whereby the axles act as equalizers extending transversely of the truck, and the comparatively short spacing apart of the journal boxes on each axle avoids severe diagonal loading of the trusk frame, as would be present with outside journals.

Without the usual equalizers, the pedestals can be made as wide and strong as may be desired to adequately resist lateral forces and the pedestals do not require removable blocks, as may be necessary if equalizers were to be assembled with the pedestals.

The side frames are of truss formation and the axes of the bolster springs are in the same general longitudinal planes as the frame side members, and this provides for a lighter frame than one in which the bolster is supported by the frame transoms as in the usual arrangement of motor trucks. This positioning of the bolster springs leaves ample room at the side of the frame for mounting brake gear units in line with the wheels, as described above.

The entire structure is compact and of light weight as compared with the usual motor truck with outside journal bearings and longitudinal equalizers.

The details of this structure may be varied substantially without departing from the spirit of the invention and the exclusive use of those modifications coming within the scope of the claims is contemplated.

What is claimed is:

1. A railway truck frame and brake operating gear assembly comprising a truck frame side member, a pair of fluid pressure cylinders, with pistons, having their axes upright, spaced apart longitudinally of and mounted on the outer side of the side frame, a bell crank-like brake lever actuated by each cylinder and piston and comprising an upright arm, pivoted at its upper end to the side frame between the other cylinder and the end of the side frame member remote from the lever-actuating cylinder, and a horizontal arm extending lengthwise of the side frame member beneath both cylinders, said horizontal arms being alongside each other, and an individual brake head on each lever below its pivot and facing toward the end of the side frame member nearest to the brake head.

2. A structure according to claim 1 in which the horizontal arm of one brake lever is inclined laterally from the end of its connected piston away from the side frame, and the horizontal arm of the other lever is inclined from the end of its connected piston toward the side frame.

3. A railway truck frame and brake operating gear assembly according to claim 1 in which the truck frame side member has a window for a bolster and bolster springs, and the brake cylinder and lever upright arms and brake heads are mounted at opposite sides of said window.

4. A railway truck frame and brake operating gear assembly according to claim 1 in which the truck frame side member has a window for a bolster and bolster springs and has spring seat support elements at the bottom of said window, and the horizontal arms of the bell cranks are positioned outboard of said support elements.

References Cited in the file of this patent

UNITED STATES PATENTS

| | | |
|---|---|---|
| 647,779 | Whomes | Apr. 17, 1900 |
| 660,647 | Normand | Oct. 30, 1900 |
| 1,640,180 | Buckwalter | Aug. 23, 1927 |
| 1,765,432 | Lamont | June 24, 1930 |
| 1,916,469 | Fagedl et al. | July 4, 1933 |
| 2,398,394 | Piron | Apr. 16, 1946 |